United States Patent
Uka et al.

(10) Patent No.: US 10,861,654 B2
(45) Date of Patent: Dec. 8, 2020

(54) ELECTROLYTIC CAPACITOR AND CONDUCTIVE POLYMER DISPERSION FOR MANUFACTURING ELECTROLYTIC CAPACITOR

(71) Applicant: Panasonic Intellectual Property Management Co., Ltd., Osaka (JP)

(72) Inventors: Youichirou Uka, Osaka (JP); Makoto Nagashima, Kyoto (JP); Tetsuro Iwasa, Kyoto (JP); Koji Okamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 16/172,458

(22) Filed: Oct. 26, 2018

(65) Prior Publication Data

US 2019/0074139 A1    Mar. 7, 2019

Related U.S. Application Data

(63) Continuation of application No. 15/234,822, filed on Aug. 11, 2016, now Pat. No. 10,199,176, which is a
(Continued)

(30) Foreign Application Priority Data

Mar. 5, 2014 (JP) ................. 2014-042238

(51) Int. Cl.
*H01G 9/15* (2006.01)
*H01G 9/028* (2006.01)
(Continued)

(52) U.S. Cl.
CPC ............. *H01G 9/15* (2013.01); *H01G 9/0032* (2013.01); *H01G 9/0036* (2013.01);
(Continued)

(58) Field of Classification Search
CPC ........ H01G 9/15; H01G 9/0032; H01G 9/028; H01G 9/04; H01G 9/07; H01G 9/0036
(Continued)

(56) References Cited

U.S. PATENT DOCUMENTS 6,677,084 B1    1/2004    Matsui et al.
2005/0212094 A1    9/2005    Takagi et al.
(Continued)

FOREIGN PATENT DOCUMENTS

CN    101091229 A    12/2007
CN    101302339 A    11/2008
(Continued)

OTHER PUBLICATIONS

English translation of Chinese Search Report dated Nov. 3, 2017 for the related Chinese Patent Application No. 201580011118.7.
(Continued)

*Primary Examiner* — Michael P McFadden
(74) *Attorney, Agent, or Firm* — McDermott Will & Emery LLP

(57) ABSTRACT

An electrolytic capacitor includes an anode body, a dielectric layer formed on the anode body, and a solid electrolyte layer covering at least a portion of the dielectric layer. The solid electrolyte layer includes a π-conjugated conductive polymer, a high-molecular-weight dopant having an acid group, and a water-soluble polymer. The water-soluble polymer is a copolymer including a hydrophilic monomer unit having a hydrophilic group. The hydrophilic group is at least one group selected from the group consisting of a carboxyl group, an acid anhydride group, a phenolic hydroxyl group, and a $C_{2-3}$ alkylene oxide group.

29 Claims, 1 Drawing Sheet

Related U.S. Application Data continuation of application No. PCT/JP2015/001097, filed on Mar. 3, 2015.

(51) Int. Cl.
*H01G 9/00* (2006.01)
*H01G 9/04* (2006.01)
*H01G 9/07* (2006.01)

(52) U.S. Cl.
CPC .............. *H01G 9/028* (2013.01); *H01G 9/04* (2013.01); *H01G 9/07* (2013.01)

(58) Field of Classification Search
USPC ........................................................ 361/525
See application file for complete search history.

(56) References Cited

U.S. PATENT DOCUMENTS

| | | | |
|---|---|---|---|
| 2006/0204854 A1 | 9/2006 | Fujimoto et al. | |
| 2008/0007893 A1 | 1/2008 | Takagi et al. | |
| 2011/0309308 A1* | 12/2011 | Meguro | C08F 220/38 252/500 |
| 2012/0256117 A1* | 10/2012 | Sugawara | H01B 1/127 252/62.2 |
| 2014/0022705 A1 | 1/2014 | Tomioka et al. | |
| 2015/0337061 A1* | 11/2015 | Yano | C07D 495/04 427/58 |
| 2016/0055981 A1* | 2/2016 | Tagawa | H01G 9/0036 361/527 |

FOREIGN PATENT DOCUMENTS

| | | |
|---|---|---|
| CN | 103459495 A | 12/2013 |
| JP | 2000-306425 A | 11/2000 |
| JP | 2001-102255 A | 4/2001 |
| JP | 2002-198095 A | 7/2002 |
| JP | 2005-281410 A | 10/2005 |
| WO | 2006/075551 A1 | 7/2006 |
| WO | 2012/137969 A1 | 10/2012 |

OTHER PUBLICATIONS

English translation of Chinese Search Report dated Jun. 5, 2018 for the related Chinese Patent Application No. 201580011118.7.
International Search Report of PCT Application No. PCT/JP2015/001097 dated May 26, 2015.
Final Office Action issued in U.S. Appl. No. 15/234,822 dated Aug. 2, 2018.
Office Action issued in U.S. Appl. No. 151234,822 dated Jan. 26, 2018.

* cited by examiner

ELECTROLYTIC CAPACITOR AND CONDUCTIVE POLYMER DISPERSION FOR MANUFACTURING ELECTROLYTIC CAPACITOR

CROSS REFERENCE

This application is a continuation application of U.S. application Ser. No. 15/234,822 filed Aug. 11, 2016, which is the continuation application of International Application No. PCT/JP2015/001097 filed Mar. 3, 2015, which claims the benefit of Japanese Application No. 2014-042238 filed Mar. 5, 2014, the entire contents of each are hereby incorporated by reference

BACKGROUND

1. Technical Field

The present disclosure relates to an electrolytic capacitor having a solid electrolyte layer that includes a conductive polymer, a conductive polymer dispersion for manufacturing the electrolytic capacitor, and a method for manufacturing the electrolytic capacitor.

2. Description of the Related Art

Recently, a compact and high-capacity capacitor for high frequency applications has been desired along with downsizing and lightening of electronic devices. As such a capacitor, an electrolytic capacitor which is small in equivalent series resistance (ESR) and excellent in frequency characteristics has been developed. The electrolytic capacitor includes an anode body having a valve metal such as tantalum, niobium, titanium, and aluminum, a dielectric layer formed on the anode body, and a cathode body. Particularly, a so-called solid electrolytic capacitor has, as a cathode member, a solid electrolyte layer including a conductive polymer, which is formed on the dielectric layer.

In some cases, the solid electrolyte layer includes, in addition to the conductive polymer, a polymer other than the conductive polymer. Unexamined Japanese Patent Publication No. 2001-102255 proposes that a binder such as polyvinyl alcohol be added to the solid electrolyte layer to impart adhesion between the dielectric layer and the solid electrolyte layer.

SUMMARY

An electrolytic capacitor according to an aspect of the present disclosure includes an anode body, a dielectric layer formed on the anode body, and a solid electrolyte layer covering at least a portion of the dielectric layer. The solid electrolyte layer includes a π-conjugated conductive polymer, a high-molecular-weight dopant having an acid group, and a water-soluble polymer. The water-soluble polymer is a copolymer including a hydrophilic monomer unit having a hydrophilic group. The hydrophilic group is at least one group selected from the group consisting of a carboxyl group, an acid anhydride group, a phenolic hydroxyl group, and a $C_{2-3}$ alkylene oxide group.

A conductive polymer dispersion for manufacturing an electrolytic capacitor according to another aspect of the present disclosure includes: a π-conjugated conductive polymer; a high-molecular-weight dopant having an acid group; a water-soluble polymer; and a solvent. The water-soluble polymer is a copolymer including a hydrophilic monomer unit having a hydrophilic group. The hydrophilic group is at least one group selected from the group consisting of a carboxyl group, an acid anhydride group, a phenolic hydroxyl group, and a $C_{2-3}$ alkylene oxide group.

The present disclosure can provide an electrolytic capacitor that has high withstand voltage and is reduced in ESR.

DETAILED DESCRIPTION OF EMBODIMENTS

Figure 1:
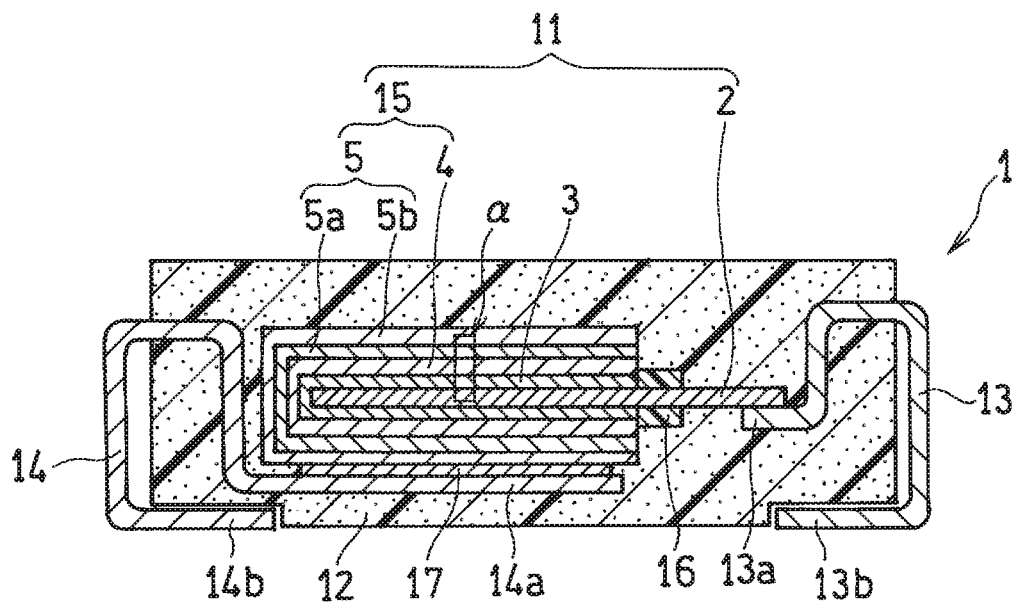
FIG. 1 is a schematic sectional view of an electrolytic capacitor according to an exemplary embodiment of the present disclosure.

Prior to describing exemplary embodiments of the present disclosure, problems in the conventional technique are briefly described. In the conventional technique disclosed in Unexamined Japanese Patent Publication No. 2001-102255, even if polyvinyl alcohol is added to a solid electrolyte layer, the solid electrolyte layer easily causes cracks, resulting in a less effect of suppressing leakage current and an insufficient effect of improving withstand voltage. Further, the film quality of the solid electrolyte layer is deteriorated, so that sufficient conductivity cannot be obtained and ESR cannot be sufficiently reduced.

In order to solve the problems, the present disclosure provides a technique capable of improving withstand voltage and reducing ESR in an electrolytic capacitor having a solid electrolyte layer.

The exemplary embodiments of the electrolytic capacitor and the method for manufacturing the electrolytic capacitor of the present disclosure are described below with reference to the drawings as required.

(Electrolytic Capacitor)

An electrolytic capacitor according to an exemplary embodiment of the present disclosure includes an anode body, a dielectric layer formed on the anode body, and a solid electrolyte layer covering at least a portion of the dielectric layer. The solid electrolyte layer includes a first conductive polymer layer covering at least a portion of the dielectric layer, and a second conductive polymer layer covering at least a portion of the first conductive polymer layer. The first conductive polymer layer includes a first conductive polymer, and the second conductive polymer layer includes a second conductive polymer and a water-soluble polymer. The water-soluble polymer is a copolymer including a hydrophilic monomer unit having a hydrophilic group. The hydrophilic group included in the hydrophilic monomer unit is at least one group selected from the group consisting of a carboxyl group, an acid anhydride group, a phenolic hydroxyl group, and a $C_{2-3}$ alkylene oxide group.

Such a water-soluble polymer is a copolymer, and therefore a three-dimensional network of a polymer chain is easily formed in the copolymer, compared to the case of a homopolymer. Further, the water-soluble polymer includes the above hydrophilic group, and therefore is high in affinity for the second conductive polymer, compared to polyvinyl alcohol or the like. In this regard, formation of cracks in the second conductive polymer layer can be suppressed, and the film quality can be densified, so that a high reinforcing effect can be obtained. By densifying, in the solid electrolyte layer, the second conductive polymer layer to which stress from the outside tends to be applied and which is positioned on an outer surface side of the electrolytic capacitor, strength of a whole solid electrolyte layer can be enhanced. Due to high strength of the solid electrolyte layer, leakage current can be suppressed, and high withstand voltage can be secured. Further, such a solid electrolyte layer can be increased in conductivity and reduce ESR of the electrolytic capacitor.

Figure 2:
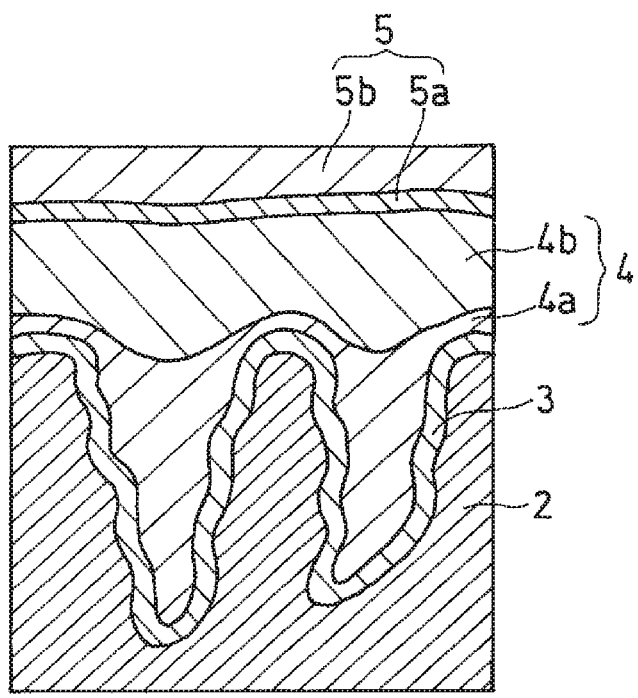
FIG. 2 is an enlarged view of an area surrounded by the solid line α in FIG. 1.

FIG. 1 is a schematic sectional view of an electrolytic capacitor according to an exemplary embodiment of the present disclosure; and FIG. 2 is an enlarged view of an area surrounded by the solid line α in FIG. 1. Electrolytic capacitor 1 includes capacitor element 11, resin outer packing 12 that seals capacitor element 11, and anode terminal 13 and cathode terminal 14 that are exposed to the outside of resin outer packing 12. Capacitor element 11 includes foil-like or plate-like anode body 2 (or an anode portion), dielectric layer 3 covering one end side of anode body 2, and cathode portion (or a cathode member) 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposite to each other with dielectric layer 3 interposed between anode body 2 and cathode portion 15. Cathode portion 15 includes solid electrolyte layer 4 covering dielectric layer 3 and cathode layer 5 covering solid electrolyte layer 4. Cathode layer 5 shown in the drawings has a two-layer structure, and includes carbon layer 5a in contact with solid electrolyte layer 4 and silver paste layer 5b covering a surface of carbon layer 5a.

In an area, on cathode portion 15 side, of the other end of anode body 2, protruding from cathode portion 15, insulating separation part 16 is formed so as to zonally cover a surface of anode body 2 to regulate contact between cathode portion 15 and anode body 2. The other end of anode body 2, protruding from cathode portion 15, is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive 17 (e.g. a mixture of a thermosetting resin and metal particles). Second end 13b of anode terminal 13 and second end 14b of cathode terminal 14 are drawn out from different side surfaces of resin outer packing 12, and each extend to one main flat surface (lower surface in FIG. 1) in an exposed state. The exposed parts of the terminals on the flat surface are used for, for example, solder connection to a substrate (not shown in the drawings) on which electrolytic capacitor 1 is to be mounted.

Dielectric layer 3 is formed on a portion of a surface of a conductive material constituting anode body 2 as a porous body. Specifically, dielectric layer 3 can be formed by anodizing the surface of the conductive material constituting anode body 2. Accordingly, dielectric layer 3 is formed along a surface (including an inner wall surface of pores) of the porous body constituting anode body 2 as shown in FIG. 2.

Solid electrolyte layer 4 that is formed so as to cover dielectric layer 3 includes first conductive polymer layer 4a covering dielectric layer 3 and second conductive polymer layer 4b covering first conductive polymer layer 4a. First conductive polymer layer 4a does not have to necessarily cover a whole (a whole surface) of dielectric layer 3, but has only to be formed so as to cover at least a portion of dielectric layer 3. It is desirable that first conductive polymer layer 4a be formed so as to cover as large an area of a surface of dielectric layer 3 as possible. Similarly, second conductive polymer layer 4b does not have to necessarily cover a whole (a whole surface) of first conductive polymer layer 4a, but has only to be formed so as to cover at least a portion of first conductive polymer layer 4a. It is desirable that second conductive polymer layer 4b be formed so as to cover as large an area of a surface of first conductive polymer layer 4a as possible. According to an exemplary embodiment of the present disclosure, second conductive polymer layer 4b includes the water-soluble polymer as described above together with the second conductive polymer to suppress cracks of second conductive polymer layer 4b, resulting in a high reinforcing effect.

Dielectric layer 3 is formed along the surface of the porous body constituting anode body 2, and therefore irregularities are formed on the surface of dielectric layer 3 in accordance with a shape of the surface of anode body 2. First conductive polymer layer 4a is preferred to be formed so as to fill such irregularities of dielectric layer 3.

In the configuration described above, anode body 2 is an anode member of capacitor element 11, and solid electrolyte layer 4 and cathode layer 5 are each a cathode member of capacitor element 11. Dielectric layer 3 is a dielectric member of capacitor element 11.

A configuration of the electrolytic capacitor is described in more detail below.

(Anode Body)

A conductive porous body can be used as anode body 2. Examples of the conductive material that forms the porous body include a valve metal, an alloy containing a valve metal, and a compound containing a valve metal. One of these materials can be used alone, or two or more of these materials can be used in combination. As the valve metal, for example, titanium, tantalum, aluminum and/or niobium is preferred to be used. These metals including oxides of the metals have a high dielectric constant, and therefore are suitable as a constituent material of anode body 2.

Examples of the alloy containing a valve metal include an alloy containing two or more valve metals and an alloy of a valve metal and a typical element (e.g. silicon and boron). It is preferred that the alloy contains the valve metal as a main component, and the rate of the valve metal in the alloy be 50 at % or more. Examples of the compound containing a valve metal include a compound containing a valve metal and a typical element (e.g. nitrogen).

Examples of the porous body include one obtained by roughening a surface of a substrate (e.g. a foil- or plate-like substrate) formed from a conductive material, and a sintered body (or a bonded body) obtained by sintering a compact that is prepared by compacting particles of a conductive material into a predetermined shape (e.g. a plate shape). When the sintered body is used as the porous body, a sintered body that is integrated with one end of an anode lead may be formed, and the other end of the anode lead may be electrically connected to anode terminal 13, if necessary. As a material of the anode lead, a known material can be used, and a material may be appropriately selected from the materials mentioned as examples of the porous body.

(Dielectric Layer)

Dielectric layer 3 is formed by anodizing or the like, a conductive material on the surface (surface including the inner wall surface of the pores of the porous body) of anode body 2, and therefore dielectric layer 3 includes an oxide of the conductive material (particularly, a valve metal). For example, when tantalum is used as the valve metal, dielectric layer 3 includes $Ta_2O_5$, and when aluminum is used as the valve metal, dielectric layer 3 includes $Al_2O_3$. Dielectric layer 3 is not limited to these examples, and it is sufficient that the layer functions as a dielectric substance.

(Solid Electrolyte Layer)

Solid electrolyte layer 4 includes first conductive polymer layer 4a covering at least a portion of dielectric layer 3 and second conductive polymer layer 4b covering at least a portion of first conductive polymer layer 4a. Second conductive polymer layer 4b may be formed so as to cover at least a portion of first conductive polymer layer 4a, and may also be formed so as to cover the whole surface of first conductive polymer layer 4a. In an area on the surface of dielectric layer 3, where first conductive polymer layer 4a is not formed, second conductive polymer layer 4b may be in contact with dielectric layer 3 (in other words, second conductive polymer layer 4b may be formed so as to cover dielectric layer 3).

(First Conductive Polymer Layer)

First conductive polymer layer 4a includes the first conductive polymer. First conductive polymer layer 4a may further include a dopant.

(First Conductive Polymer)

As the first conductive polymer, a known polymer, e.g. a π-conjugated conductive polymer, used for an electrolytic capacitor, can be used. Examples of such a conductive polymer include a polymer having, as a basic skeleton, polypyrrole, polythiophene, polyfuran, polyaniline, polyacetylene, polyp henylene, polyphenylene vinylene, polyacene, and/or polythiophene vinylene.

Such a polymer includes a homopolymer, a copolymer of two or more kinds of monomers, and a derivative (e.g. a substitute having a substituent) of these polymers. Examples of polythiophene include poly(3,4-ethylenedioxythiophene). Such a conductive polymer has high conductivity and is excellent in ESR characteristics. One of the conductive polymers may be used alone, or two or more of the conductive polymers may be used in combination. A weight average molecular weight of the conductive polymer is not particularly limited, and ranges, for example, from 1,000 to 1,000,000 (both inclusive).

(Dopant)

First conductive polymer layer 4a can further include a dopant. The dopant may be included in first conductive polymer layer 4a in a state of being doped in the first conductive polymer. The dopant may also be included in first conductive polymer layer 4a in a state of being bonded to the first conductive polymer.

As the dopant, for example, a low-molecular-weight compound (also referred to as a low-molecular-weight dopant) or a high-molecular-weight compound (also referred to as a high-molecular-weight dopant) is used, which has an acid group (or an anionic group). When the high-molecular-weight dopant is used, more homogeneous first conductive polymer layer 4a can be formed. One of the dopants can be used alone or two or more of the dopants can be used in combination.

As the low-molecular-weight dopant, a compound (low-molecular-weight compound (monomer compound)) can be used, which has an anionic group such as a sulfonate group, a carboxyl group, a phosphate group, and/or a phosphonate group. As such a compound, for example, a cyclic compound can be used, in which an anionic group is bonded to an aromatic ring (e.g. a $C_{6-14}$ aromatic ring) of benzene, naphthalene, anthracene, or the like, or to a fused ring of an aromatic ring (e.g. a $C_{6-14}$ aromatic ring) and an aliphatic ring. As the anionic group, the sulfonate group is preferred, and a combination of the sulfonate group with an anionic group other than the sulfonate group is also acceptable. The aromatic ring and/or the aliphatic ring constituting a cyclic compound may also include a substituent (e.g. an alkyl group such as a methyl group, and an oxo group (═O)), other than the anionic group. Specific examples of such a compound include an alkylbenzene sulfonic acid such as benzenesulfonic acid and p-toluenesulfonic acid, naphthalenesulfonic acid, and anthraquinone sulfonic acid.

As the high-molecular-weight dopant, for example, a high-molecular-weight compound can be used, which has an anionic group such as a sulfonate group, a phosphate group, and/or a phosphonate group. Among the anionic groups, the sulfonate group is preferred. Examples of the high-molecular-weight dopant having a sulfonate group include a homopolymer or a copolymer of a monomer having a sulfonate group (e.g. a vinyl monomer having a sulfonate group and a diene monomer having a sulfonate group, such as isoprenesulfonic acid). Examples of the vinyl monomer having a sulfonate group include aliphatic vinyl monomers having a sulfonate group, such as vinylsulfonic acid, allylsulfonic acid, and 2-acrylamido-2-methylpropanesulfonic acid, and aromatic vinyl monomers having a sulfonate group, such as styrenesulfonic acid. One of these vinyl monomers can be used alone, or two or more of these vinyl monomers may be used in combination. The copolymer may be a copolymer obtained from two or more kinds of monomers having a sulfonate group, or may be a copolymer of a monomer having a sulfonate group and another monomer. The high-molecular-weight dopant also includes, for example, polyester sulfonic acid and/or a phenolsulfonic acid novolak resin.

A weight average molecular weight of the high-molecular-weight dopant ranges, for example, from 1,000 to 1,000,000 (both inclusive), preferably from 10,000 to 500,000 (both inclusive). When a high-molecular-weight dopant having such a molecular weight is used, first conductive polymer layer 4a is further easily homogenized. In the cases of the homopolymer and the copolymer of a monomer having a sulfonate group, the weight average molecular weight more preferably ranges from 10,000 to 500,000 (both inclusive). In the cases of the polyester sulfonic acid and the phenolsulfonic acid novolak resin, the weight average molecular weight more preferably ranges from 5,000 to 80,000 (both inclusive).

An amount of the dopant included in first conductive polymer layer 4a preferably ranges from 10 parts by mass to 1,000 parts by mass (both inclusive), more preferably from 50 parts by mass to 200 parts by mass (both inclusive), relative to 100 parts by mass of the first conductive polymer.

Anode body 2 is usually a porous body, and therefore not only on an outer surface but also in an inside of the anode body, dielectric layer 3 is formed. It is preferred that first conductive polymer layer 4a be also formed on such dielectric layer 3 formed in the inside of the anode body so that coverage by first conductive polymer layer 4a be increased. From the viewpoint of increasing the coverage by first conductive polymer layer 4a, it is preferred that first conductive polymer layer 4a do not include such a water-soluble polymer included in second conductive polymer layer 4b, or that even when first conductive polymer layer 4a includes a water-soluble polymer, content of the water-soluble polymer be as small as possible. When first conductive polymer layer 4a includes the water-soluble polymer, the content of the water-soluble polymer in first conductive polymer layer 4a is, for example, preferably less than content of the water-soluble polymer included in second conductive polymer layer 4b, more preferably 5% by mass or less.

(Second Conductive Polymer Layer)

Second conductive polymer layer 4b includes the second conductive polymer and the water-soluble polymer. Due to inclusion of the water-soluble polymer in second conductive polymer layer 4b, strength of second conductive polymer layer 4b (eventually, strength of solid electrolyte layer 4) can be enhanced, withstand voltage thereof can be improved, conductivity of solid electrolyte layer 4 can be further increased, and ESR can be reduced.

(Second Conductive Polymer)

As the second conductive polymer, a known polymer used for an electrolytic capacitor can be used. Specifically, a polymer can be appropriately selected from the conductive polymers mentioned as examples of the first conductive polymer. A weight average molecular weight of the second conductive polymer can also be appropriately selected from the ranges mentioned as examples of the first conductive polymer. The same conductive polymer or different conductive polymers may be used for the first conductive polymer and the second conductive polymer.

Second conductive polymer layer 4b can further include a dopant. As the dopant, a known dopant used for an electrolytic capacitor can be used. Specifically, a dopant can be appropriately selected from the dopants mentioned as examples of first conductive polymer layer 4a. The same dopant or different dopants may be used for first conductive polymer layer 4a and second conductive polymer layer 4b. The dopant may be included in second conductive polymer layer 4b in a state of being doped in the second conductive polymer. The dopant may be included in second conductive polymer layer 4b in a state of being bonded to the second conductive polymer.

An amount of the dopant included in second conductive polymer layer 4b preferably ranges from 10 parts by mass to 1,000 parts by mass (both inclusive), more preferably from 50 parts by mass to 200 parts by mass (both inclusive), relative to 100 parts by mass of the second conductive polymer.

(Water-Soluble Polymer)

The water-soluble polymer is a copolymer including a hydrophilic monomer unit having a hydrophilic group. The hydrophilic group is at least one group selected from the group consisting of a carboxyl group, an acid anhydride group, a phenolic hydroxyl group, and a $C_{2-3}$ alkylene oxide group. The $C_{2-3}$ alkylene oxide group is a chain group.

A hydrophilic monomer corresponding to the hydrophilic monomer unit includes the above hydrophilic group, and a polymerizable group or a polymerizable moiety. The hydrophilic monomer may include the hydrophilic group and the polymerizable group directly linked to each other, or may include the hydrophilic group, the polymerizable group, and a linking group linking the hydrophilic group to the polymerizable group. The hydrophilic monomer may be aliphatic, alicyclic or aromatic. When a water-soluble polymer including an aromatic hydrophilic monomer unit is used, the presence of an aromatic ring enhances affinity for the conductive polymer, so that film formability of the conductive polymer layer can be expected to be enhanced.

A number of the hydrophilic group in a hydrophilic monomer (or a hydrophilic monomer unit) is not particularly limited, and may be one or more. When the hydrophilic monomer (or a hydrophilic monomer unit) has a plurality of hydrophilic groups, kinds of the hydrophilic groups may be the same or different.

The hydrophilic monomer unit (or a hydrophilic monomer corresponding to the hydrophilic monomer unit) included in the copolymer may be of one kind, or two or more kinds. For example, it is preferred that at least a part (or whole) of a hydrophilic monomer unit included in the copolymer include (a) a hydrophilic monomer unit (first monomer unit) having, as the hydrophilic group, a carboxyl group, an acid anhydride group and/or a phenolic hydroxyl group, or (b) a hydrophilic monomer unit (second monomer unit) having, as the hydrophilic group, a $C_{2-3}$ alkylene oxide group. It is also preferred that the copolymer include, as the hydrophilic monomer unit, the first monomer unit and the second monomer unit.

When the copolymer includes the first monomer unit and/or the second monomer unit, each of the first monomer unit and the second monomer unit included in the copolymer may be of one kind or two or more kinds. In the present specification, a carboxyl group, an acid anhydride group and/or a phenolic hydroxyl group among the hydrophilic groups is referred to as a first hydrophilic group, and a $C_{2-3}$ alkylene oxide group among the hydrophilic groups is referred to as a second hydrophilic group in some cases.

Examples of the polymerizable group or the polymerizable moiety of the hydrophilic monomer include a vinyl group and an ether ring (e.g. an ethylene oxide ring and an oxetane ring). The vinyl group and the ether ring may have a substituent (e.g. an alkyl group and a halogen atom). As the alkyl group, a $C_{1-4}$ alkyl group (particularly a $C_{1-2}$ alkyl group) such as a methyl group and an ethyl group is preferred.

Examples of the linking group include an alkylidene group, an alkylene group (e.g. a $C_{2-10}$ alkylene group such as an ethylene group, a propylene group, and a trimethylene group), a cycloalkylene group (e.g. a $C_{5-8}$ cycloalkylene group) such as a cyclohexanediyl group, and an arylene group (e.g. a $C_{6-10}$ arylene group such as a phenylene group and a naphthylene group). The cycloalkylene group and the arylene group may have a substituent (e.g. an alkyl group and a halogen atom such as Cl and Br). As the alkyl group, a $C_{1-4}$ alkyl group (particularly a $C_{1-2}$ alkyl group) such as a methyl group and an ethyl group is preferred.

As the hydrophilic monomer (first monomer) corresponding to the first monomer unit, a vinyl monomer is preferred, which has together with the first hydrophilic group a vinyl group as the polymerizable group. Examples of the hydrophilic monomer having a carboxyl group and/or an acid anhydride group among the first monomers include acrylic acid, methacrylic acid, and a 2-alkyl-2-propenoic acid such as 2-ethyl-2-propenoic acid, a polymerizable unsaturated polycarboxylic acid such as maleic acid and fumaric acid, or an anhydride of the polymerizable unsaturated polycarboxylic acid (e.g. maleic anhydride), and an aromatic vinyl compound having a carboxyl group, such as 4-carboxystyrene. Among these hydrophilic monomers, at least one monomer selected from the group consisting of acrylic acid, a 2-$C_{1-4}$ alkyl-2-propenoic acid, maleic acid, maleic anhydride, and fumaric acid is preferred, and at least one monomer selected from the group consisting of acrylic acid and a 2-$C_{1-2}$ alkyl-2-propenoic acid is more preferred.

Examples of the hydrophilic monomer having a phenolic hydroxyl group among the first monomers include a hydroxy-vinyl $C_{6-10}$ arene, for example, a vinylphenol (e.g. 4-vinylphenol and 1-methyl-4-vinylphenol), and 1,4-dihydroxy-3-vinylbenzene. Among these hydrophilic monomers, the vinylphenol is preferred. The hydroxy-vinyl $C_{6-10}$ arene may also include, in the $C_{6-10}$ arene ring, a substituent, for example, an alkyl group (e.g. a $C_{1-4}$ alkyl group such as a methyl group and an ethyl group) and a halogen atom.

Examples of the $C_{2-3}$ alkylene oxide group as the second hydrophilic group include an ethylene oxide group (—CH$_2$CH$_2$O—), a propylene oxide group (—CH$_2$CH(CH$_3$)O— or —CH(CH$_3$)CH$_2$O—), and a trimethylene oxide group (—CH$_2$CH$_2$CH$_2$O—). The second monomer unit is specifically a C$_{2-3}$ alkylene oxide unit corresponding to the C$_{2-3}$ alkylene oxide group. As the second monomer unit, a unit having an ethylene oxide group as the second hydrophilic group, i.e. an ethylene oxide unit is preferred.

As the hydrophilic monomer (second monomer) corresponding to the second monomer unit, although a vinyl monomer having the second hydrophilic group may be used, a cyclic ether (e.g. ethylene oxide, propylene oxide and oxetane) corresponding to the second hydrophilic group and/or a glycol (e.g. a C$_{2-3}$ alkylene glycol such as ethylene glycol, propylene glycol and trimethylene glycol) corresponding to the second hydrophilic group is preferred.

In the copolymer, second monomer units may be randomly present, and a segment (specifically, a poly(C$_{2-3}$ alkylene oxide) segment) may be formed, in which a plurality of second monomer units are linked to each other. An average number of repeating units (average degree of polymerization) of the C$_{2-3}$ alkylene oxide unit in the poly(C$_{2-3}$ alkylene oxide) segment ranges, for example, from 5 to 100 (both inclusive), preferably from 10 to 50 (both inclusive). When the copolymer includes such a segment, water solubility of the copolymer is easily increased, compared to the case in which the second monomer units are randomly present.

In the copolymer including the hydrophilic monomer unit described above, hydrophilic monomer units tend to align randomly in a polymer chain, and therefore the polymer chain grows three-dimensionally. When the copolymer includes a segment containing the second monomer units, the number of repeating units is relatively small, and therefore a three-dimensional structure of a polymer chain is also easily secured. The copolymer has a three-dimensional network to give dense second conductive polymer layer 4b that hardly causes cracks. Particularly, first monomer units tend to be linked randomly to easily give a random copolymer. Such a random copolymer is used to further enhance strength of second conductive polymer layer 4b.

The copolymer may be a copolymer including two or more kinds of hydrophilic monomer units or may be a copolymer including at least one kind of hydrophilic monomer unit and another monomer unit (third monomer unit). A copolymer including two or more (e.g. two or three) different kinds of first monomer units is also preferred. When the copolymer includes two or more kinds of first monomer units, the first monomer units of each kind are also preferred to be present randomly in the copolymer.

A rate of the hydrophilic monomer unit in the copolymer is, for example, 30 mol % or more, preferably 40 mol % or more or 50 mol % or more, and may be 65 mol % or more. The rate of the hydrophilic monomer unit in the copolymer is 100 mol % or less, and in the case of the copolymer including the third monomer unit, the rate may be, for example, 95 mol % or less, or 90 mol % or less. Any combination of these lower limit values and upper limit values is possible. The rate of the hydrophilic monomer unit in the copolymer may range, for example, from 30 mol % to 100 mol % (both inclusive), from 40 mol % to 100 mol % (both inclusive), or from 50 mol % to 100 mol % (both inclusive).

When the copolymer includes two or more kinds of first monomer units, it is preferred that the rate of one kind of first monomer unit in the copolymer range from 20 mol % to 80 mol % (both inclusive), and the remaining one or more kinds of first monomer units account for the rest. For example, the rate of an acrylic acid unit in the copolymer may be set to range from 20 mol % to 80 mol % (both inclusive), and one or more kinds of first monomer units (e.g. a hydrophilic monomer unit having a carboxyl group and/or an acid anhydride group) other than the acrylic acid unit may account for the rest.

The third monomer unit and/or a monomer (third monomer) corresponding to the third monomer unit may be either hydrophobic or hydrophilic. Water solubility (or hydrophilicity) of the water-soluble polymer can be controlled by adjusting the kind of the hydrophilic monomer unit, the kind of the third monomer unit, and/or the ratio among the monomer units in the copolymer.

Examples of the third monomer include a vinyl monomer having an ester group (e.g. (meth)acrylic acid ester and vinyl acetate), a vinyl cyanide monomer (e.g. acrylonitrile), and an aromatic vinyl monomer (e.g. a vinyl C$_{6-10}$ arene such as styrene and vinyltoluene). The copolymer may include a vinyl alcohol unit as the third monomer unit. Even when the copolymer includes the vinyl alcohol unit, a high reinforcing effect can be obtained in solid electrolyte layer 4 due to inclusion of the above hydrophilic monomer unit in the copolymer, in contrast with the case of including polyvinyl alcohol in a solid electrolyte layer. When a vinyl alcohol unit is used as the third monomer unit, the rate of the vinyl alcohol unit in the copolymer is preferred to be 10 mol % or less. By setting the rate of the vinyl alcohol unit as described above, even when the copolymer includes the vinyl alcohol unit, deterioration in conductivity of solid electrolyte layer 4 can be suppressed. An acrylic acid ester and a methacrylic acid ester are collectively referred to as a (meth)acrylic acid ester.

Examples of the (meth)acrylic acid ester include alkyl (meth)acrylates (e.g. a C$_{1-4}$ alkyl (meth)acrylate) such as methyl (meth)acrylate and ethyl (meth)acrylate; and hydroxyalkyl (meth)acrylates (e.g. a hydroxy C$_{1-4}$ alkyl (meth)acrylate) such as 2-hydroxyethyl (meth)acrylate and 2-hydroxypropyl (meth)acrylate. The copolymer may include one kind of third monomer unit and may also include two or more kinds of third monomer units.

As the third monomer, at least one monomer selected from the group consisting of a vinyl monomer having an ester group (e.g. a (meth)acrylic acid ester) and an aromatic vinyl monomer is preferred. The former can be expected to increase moisture resistance of second conductive polymer layer 4b by including an ester group, and the latter can be expected to enhance film formability of second conductive polymer layer 4b because affinity for the conductive polymer is enhanced due to the presence of an aromatic ring.

A weight average molecular weight of the water-soluble polymer ranges, for example, from 10,000 to 500,000 (both inclusive), preferably from 15,000 to 300,000 (both inclusive), more preferably from 20,000 to 200,000 (both inclusive), or from 30,000 to 150,000 (both inclusive). When the water-soluble polymer has such a weight average molecular weight, an effect of reinforcing solid electrolyte layer 4 can be further increased, high withstand voltage can be obtained, and ESR is easily reduced.

A ratio of the weight average molecular weight of the water-soluble polymer to the weight average molecular weight of the high-molecular-weight dopant ranges, for example, from 0.1 to 10 (both inclusive), preferably from 0.15 to 5 (both inclusive) or from 0.15 to 2.5 (both inclusive), more preferably from 0.25 to 2.5 (both inclusive) or from 0.4 to 2 (both inclusive). When the ratio between the weight average molecular weights falls within such a range, the effect of reinforcing solid electrolyte layer 4 can be further increased. Further, deterioration in temporal stability of solid electrolyte layer 4 is easily suppressed.

The water-soluble polymer is preferred to have a mass that is soluble in 100 g of water of, for example, 1 g or more or 5 g or more at 25° C. Such a water-soluble polymer is high in water solubility, making it possible for the water-soluble polymer to be present homogeneously in a second treatment liquid for forming second conductive polymer layer 4b.

An amount of the water-soluble polymer in second conductive polymer layer 4b ranges, for example, from 1 part by mass to 100 parts by mass (both inclusive), preferably from 10 parts by mass to 50 parts by mass (both inclusive), relative to 100 parts by mass of the second conductive polymer.

An average thickness of second conductive polymer layer 4b ranges, for example, from 5 µm to 100 µm (both inclusive), preferably from 10 µm to 50 µm (both inclusive). When the average thickness falls within such a range, strength of second conductive polymer layer 4b can be further enhanced.

A ratio of the average thickness of second conductive polymer layer 4b to the average thickness of first conductive polymer layer 4a is, for example, 5 times or more, preferably 10 times or more. When the ratio between the average thicknesses falls within such a range, the whole strength of solid electrolyte layer 4 can be enhanced by second conductive polymer layer 4b on which stress from the outside tends to be applied in solid electrolyte layer 4.

Described in the above exemplary embodiment is a case in which solid electrolyte layer 4 has a two-layer structure including first conductive polymer layer 4a and second conductive polymer layer 4b, but solid electrolyte layer 4 may have a three- or more layer structure. In the case of a three- or more layer structure, at least one conductive polymer layer can be formed between first conductive polymer layer 4a and second conductive polymer layer 4b.

Solid electrolyte layer 4 may further include a known additive, and/or a known conductive material (e.g. a conductive inorganic material such as manganese dioxide; and/or a TCNQ complex salt) other than the conductive polymer, if necessary. In the meantime, between dielectric layer 3 and first conductive polymer layer 4a, and/or between first conductive polymer layer 4a and second conductive polymer layer 4b may be interposed another layer, for example, a layer for increasing coverage by first conductive polymer layer 4a or second conductive polymer layer 4b, and/or a layer for increasing adhesion between the layers.

(Method for Manufacturing Electrolytic Capacitor)

A method for manufacturing an electrolytic capacitor according to an exemplary embodiment of the present disclosure includes: a first step of preparing anode body 2; a second step of forming dielectric layer 3 on anode body 2; and a third step of forming solid electrolyte layer 4 covering at least a portion of dielectric layer 3. The third step includes a step A of forming first conductive polymer layer 4a and a step B of forming second conductive polymer layer 4b. The steps are described in detail below.

(First Step)

In the first step, anode body 2 is formed by a known method according to a kind of anode body 2. Anode body 2 is a porous body, and can be prepared by, for example, roughening a surface of a foil- or plate-like substrate formed from a conductive material. It is sufficient that roughening can form irregularities on the surface of the substrate. Roughening may be conducted, for example, by subjecting the surface of the substrate to etching (e.g. electrolytic etching), or by depositing particles of a conductive material on the surface of the substrate using a gas phase method such as vapor deposition.

(Second Step)

In the second step, dielectric layer 3 is formed on anode body 2. Dielectric layer 3 is formed by anodizing the surface of anode body 2. Anodization can be performed by a known method, for example, an anodizing treatment. The anodizing treatment can be conducted, for example, by immersing anode body 2 in an anodizing solution to impregnate the surface (surface including an inner wall surface of pores of the porous body) of anode body 2 with the anodizing solution, and applying a voltage between anode body 2 as an anode and a cathode immersed in the anodizing solution. As the anodizing solution, for example, an aqueous solution of phosphoric acid, an aqueous solution of ammonium phosphate, or an aqueous solution of ammonium adipate is preferred to be used.

(Third Step)

(Step A)

In the step A, first conductive polymer layer 4a including a first conductive polymer and covering at least a portion of dielectric layer 3 is formed by a first treatment liquid. Specifically, for example, anode body 2 on which dielectric layer 3 is formed is immersed in the first treatment liquid to impregnate with the first treatment liquid the surface (surface including the inner wall surface of the pores of the porous body, on which dielectric layer 3 is formed) of anode body 2, on which dielectric layer 3 is formed, and then, anode body 2 is taken out and dried. During drying, anode body 2 may be heated, if necessary.

Examples of first conductive polymer layer 4a include a film (or a coating film) formed by drying anode body 2 after bringing anode body 2 on which dielectric layer 3 is formed into contact with the first treatment liquid containing the first conductive polymer. Such a film is not particularly limited to the film formed by the above method, and can be formed by not only various coating methods (e.g. an immersion method (dip-coating method) and a spray-coating method) but also a printing method or a combination of these methods, for example.

Examples of the first treatment liquid containing the first conductive polymer include a solution containing a solvent and the first conductive polymer dissolved in the solvent, and a dispersion liquid containing a dispersion medium and a dispersoid (or a dispersion phase) of the first conductive polymer dispersed in the dispersion medium. When such a solution or a dispersion liquid is used as the first treatment liquid, first conductive polymer layer 4a can be easily formed, and first conductive polymer layer 4a having stable quality is easily obtained. Particularly, use of the dispersion liquid is preferred. A form of the dispersoid in the dispersion liquid is not particularly limited. The form may be a fiber, but is preferred to be particles (or a powder). An average particle size of dispersoid particles in the dispersion liquid is preferred to range from 5 nm to 100 nm (both inclusive). The average particle size can be obtained, for example, from a particle size distribution measured by a dynamic light scattering method.

Examples of the solvent or the dispersion medium contained in the first treatment liquid include water, an organic medium, and a mixture of water and the organic medium. Examples of the organic medium include aliphatic alcohols having 1 to 5 (both inclusive) carbon atoms (e.g. aliphatic monools such as methanol, ethanol, propanol and 1-butanol; and aliphatic polyols such as ethylene glycol and glycerin); aliphatic ketones such as acetone; nitriles such as acetonitrile and benzonitrile; amides such as N,N-dimethylformamide; and sulfoxides such as dimethyl sulfoxide.

The first treatment liquid can contain a component (e.g. a dopant) other than the first conductive polymer among constituent components of first conductive polymer layer 4a, if necessary.

First conductive polymer layer 4a may also be a polymerized film formed by impregnating anode body 2 on which dielectric layer 3 is formed with the first treatment liquid containing a raw material of the first conductive polymer, followed by polymerization (chemical polymerization, electrolytic polymerization, or the like). Examples of the raw material of the first conductive polymer include a precursor of the first conductive polymer, for example, a monomer constituting the first conductive polymer and/or an oligomer in which some monomers are linked to each other.

For formation of the polymerized film, an oxidant is used for polymerizing the raw material of the first conductive polymer. The oxidant may be added to the first treatment liquid. The oxidant may be applied onto anode body 2 before or after anode body 2 on which dielectric layer 3 is formed is immersed in the first treatment liquid. Examples of such an oxidant include a metal sulfonate. The metal sulfonate also has a function as a dopant in addition to a function as an oxidant. Examples of a moiety constituting a sulfonic acid of the metal sulfonate include an alkyl sulfonic acid and/or an aromatic sulfonic acid (e.g. benzenesulfonic acid, toluenesulfonic acid, and naphthalenedisulfonic acid). Examples of a metal moiety constituting a metal salt include iron (III), copper (II), chromium (IV) and/or zinc (II).

The first treatment liquid used for forming the polymerized film can contain a solvent. As the solvent, a solvent can be appropriately selected from the solvents mentioned as examples of the first treatment liquid used for forming the above film (coating film). The first treatment liquid used for forming the polymerized film can also contain a component (e.g. a dopant) other than (a raw material of) the first conductive polymer among constituent components of first conductive polymer layer 4a, if necessary.

(Step B)

In the step B, second conductive polymer layer 4b covering at least a portion of first conductive polymer layer 4a is formed by a second treatment liquid after the step A. Second conductive polymer layer 4b on an outer surface side can be densified by the step B, so that strength of the solid electrolyte layer can be enhanced, and withstand voltage can be improved. The step B can be carried out by the same procedure as in the step A or a procedure according to the step A, except that the treatment liquid has a different composition and that second conductive polymer layer 4b is formed so as to cover a surface of first conductive polymer layer 4a.

The second treatment liquid contains a second conductive polymer or a raw material of the second conductive polymer, and a water-soluble polymer or a raw material of the water-soluble polymer. As the second treatment liquid, although a solution containing a raw material of the second conductive polymer and a raw material of the water-soluble polymer can be used, a solution containing the second conductive polymer and the water-soluble polymer, a solution containing the second conductive polymer and a raw material of the water-soluble polymer, or a solution containing a raw material of the second conductive polymer and the water-soluble polymer is preferred.

When the second treatment liquid contains the second conductive polymer and the water-soluble polymer, second conductive polymer layer 4b is a film obtained by immersing anode body 2 in the second treatment liquid to impregnate with the second treatment liquid the surface (surface including the inner wall surface of the pores of the porous body, on which first conductive polymer layer 4a is formed) of anode body 2, which includes dielectric layer 3 on which first conductive polymer layer 4a is formed, followed by drying. Such a film can be formed according to a method when the film including the first conductive polymer is formed.

When the second treatment liquid contains a raw material of the second conductive polymer and/or a raw material of the water-soluble polymer, second conductive polymer layer 4b is a polymerized film obtained by immersing anode body 2 in the second treatment liquid to impregnate with the second treatment liquid the surface (surface including the inner wall surface of the pores of the porous body, on which first conductive polymer layer 4a is formed) of anode body 2, which includes dielectric layer 3 on which first conductive polymer layer 4a is formed, so that the raw material(s) is polymerized (chemical polymerization, electrolytic polymerization, or the like).

When the second treatment liquid contains the second conductive polymer and/or the water-soluble polymer, second conductive polymer layer 4b can be easily formed, and the quality of the polymers tends to be stable, compared to the case of using raw material(s). Particularly, when the second treatment liquid containing the second conductive polymer and the water-soluble polymer (i.e. the second treatment liquid for forming the above film), phase separation of one of the polymers is suppressed to easily give second conductive polymer layer 4b in a state in which both the polymers are homogeneously dispersed. Thus, cracks are suppressed and film quality can be further densified, to give advantage of enhancing strength. When one of the polymers (particularly, the water-soluble polymer) is phase separated, the phase separated polymer may possibly flow out by a washing treatment or the like after formation of second conductive polymer layer 4b.

Examples of the second treatment liquid used for forming the film include a solution containing a solvent, and the second conductive polymer and the water-soluble polymer dissolved in the solvent, and a dispersion liquid containing a dispersion medium, the second conductive polymer, and the water-soluble polymer. Among these examples, particularly, use of the dispersion liquid is preferred.

In the dispersion liquid, at least the second conductive polymer of the second conductive polymer and the water-soluble polymer is present as a dispersoid (or a dispersion phase) dispersed in the dispersion medium. The water-soluble polymer is in a state of being dissolved in the dispersion medium (i.e. a liquid phase of the dispersion liquid) and/or is present as a dispersoid (or a dispersion phase) according to a kind and composition of the dispersion medium. The water-soluble polymer is preferred to be present in a state of being dissolved in the dispersion medium. In this case, phase separation between the second conductive polymer and the water-soluble polymer is easily suppressed to form second conductive polymer layer 4b whose film quality is more homogeneous and whose strength is further enhanced.

A form of the dispersoid in the dispersion liquid is not particularly limited. The form may be a fiber, but is preferred to be particles (or a powder). An average particle size of dispersoid particles dispersed in the dispersion liquid may fall within the range described for the first treatment liquid.

As the solvent or the dispersion medium contained in the second treatment liquid, a solvent can be appropriately selected from the solvents mentioned as examples of the first treatment liquid. From the viewpoint of making the water-soluble polymer present in the dispersion medium (liquid phase) of the dispersion liquid, the dispersion medium is preferred to contain at least water. The second treatment liquid can contain a component (e.g. a dopant) other than the second conductive polymer and the water-soluble polymer among constituent components of second conductive polymer layer 4b, if necessary.

The second treatment liquid for forming the polymerized film contains a raw material of the second conductive polymer and/or a raw material of the water-soluble polymer. Examples of the raw material of the second conductive polymer include a precursor of the second conductive polymer, for example, a monomer constituting the second conductive polymer and/or an oligomer in which some monomers are linked to each other. Examples of the raw material of the water-soluble polymer include a precursor of the water-soluble polymer, for example, a monomer constituting the water-soluble polymer and/or an oligomer in which some monomers are linked to each other.

For formation of the polymerized film, an oxidant is used for polymerizing the raw material of the second conductive polymer and/or the raw material of the water-soluble polymer, similarly to the case of first conductive polymer layer 4a. The oxidant may be added to the second treatment liquid, or may be applied onto anode body 2 before or after anode body 2 is immersed in the second treatment liquid. As the oxidant, an oxidant can be appropriately selected from the oxidants mentioned as examples of first conductive polymer layer 4a.

The second treatment liquid used for forming the polymerized film can contain a solvent. As the solvent, a solvent can be appropriately selected from the solvents mentioned as examples of the second treatment liquid used for forming the above film (coating film). The second treatment liquid used for forming the polymerized film can also contain a component (e.g. a dopant) other than the second conductive polymer (or a raw material of the second conductive polymer) and the water-soluble polymer (or a raw material of the water-soluble polymer) among constituent components of second conductive polymer layer 4b, if necessary.

(Step of Forming Cathode Layer)

The method for manufacturing an electrolytic capacitor can further include a step (fourth step) of forming cathode layer 5. In the fourth step, carbon layer 5a and silver paste layer 5b are sequentially laminated over the surface of solid electrolyte layer 4 obtained in the third step to form cathode layer 5.

Carbon layer 5a can be formed by immersing anode body 2 including dielectric layer 3 on which solid electrolyte layer 4 is formed in an aqueous dispersion of carbon (e.g. a conductive carbon material such as graphite), or by applying a carbon paste onto the surface of solid electrolyte layer 4. The carbon paste is a composition containing a conductive carbon material such as graphite. A thickness of carbon layer 5a ranges, for example, from 1 μm to 20 μm (both inclusive).

The silver paste is a composition containing silver particles and a resin (binder resin). As the resin, although a thermoplastic resin can be used, a thermosetting resin is preferred to be used. A thickness of silver paste layer 5b ranges, for example, from 50 μm to 100 μm (both inclusive). The configuration of cathode layer 5 is not limited to this example, and it is sufficient that cathode layer 5 has a function of power collection.

EXAMPLES

The present disclosure is specifically described below with reference to examples and comparative examples. The present disclosure, however, is not limited to the examples below.

Example 1

Electrolytic capacitor 1 shown in FIG. 1 was prepared in the manner described below, and the characteristics of the electrolytic capacitor were evaluated.

(1) Step of Preparing Anode Body 2 (First Step)

Both surfaces of an aluminum foil (thickness: 100 μm) as a substrate was roughened by etching to prepare anode body 2.

(2) Step of Forming Dielectric Layer 3 (Second Step)

A part on one end side of anode body 2 (a part from a separation part to the one end) was immersed in an anodizing solution, and a 70 V DC voltage was applied for 20 minutes to form dielectric layer 3 including aluminum oxide.

(3) Step of Forming First Conductive Polymer Layer 4a (Step A)

A 3,4-ethylenedioxythiophene monomer was added under agitation to an aqueous solution of polystyrene sulfonic acid (weight average molecular weight: 75,000), and then oxidants (iron(III) sulfate and sodium persulfate) were added to the solution to carry out chemical oxidative polymerization. The obtained polymerization solution was subjected to filtration by ion-exchange equipment to remove impurities. Thus, a solution was obtained, which contained poly(3,4-ethylenedioxythiophene) (PEDOT) as the first conductive polymer and polystyrene sulfonic acid (PSS) as a dopant.

Pure water was added to the obtained solution, and the mixture was homogenized by a high-pressure homogenizer and was further subjected to filtration by a filter to prepare a first treatment liquid in a state of a dispersion liquid. Anode body 2, on which dielectric layer 3 was formed, obtained in the above step (2), was immersed in the first treatment liquid. After that, anode body 2 was taken out of the first treatment liquid, and further dried at 120° C. for a period ranging from 10 minutes to 30 minutes (both inclusive). Immersion in the first treatment liquid and drying were repeated again, respectively, to form first conductive polymer layer 4a so as to cover the surface of dielectric layer 3. The average thickness of first conductive polymer layer 4a measured by a scanning electron microscope (SEM) was about 1 μm.

(4) Step of Forming Second Conductive Polymer Layer 4b (Step B)

In the same manner as in the above step (3), a solution was obtained, which contained PEDOT as the second conductive polymer and PSS (weight average molecular weight: 75,000) as a dopant. Pure water was added to the obtained solution, and the mixture was homogenized by a high-pressure homogenizer and was further subjected to filtration by a filter to prepare a dispersion liquid. A water-soluble polymer was added to the obtained dispersion liquid, the water-soluble polymer being an acrylic acid-methacrylic acid copolymer (p1) (random copolymer, copolymerization ratio (molar ratio):acrylic acid:methacrylic acid=50:50, weight average molecular weight 100,000). The mixture was agitated to prepare a second treatment liquid in a state of a dispersion liquid. The water-soluble polymer was added to the dispersion liquid in such an amount that the water-soluble polymer was 30 parts by mass relative to 100 parts by mass of PEDOT in the mixture.

Anode body 2 including dielectric layer 3 which was covered with first conductive polymer layer 4a, obtained in the above step (3), was immersed in the second treatment liquid. After that, anode body 2 was taken out of the second treatment liquid, and further dried at 120° C. for a period ranging from 10 minutes to 30 minutes (both inclusive). Immersion in the second treatment liquid and drying were further alternately repeated twice to form second conductive polymer layer 4b so as to cover the surface of first conductive polymer layer 4a. The average thickness of second conductive polymer layer 4b was measured in the same manner as in first conductive polymer layer 4a, and the average thickness was about 30 μm. Thus, solid electrolyte layer 4 including first conductive polymer layer 4a and second conductive polymer layer 4b was formed so as to cover the surface of dielectric layer 3.

(5) Step of Forming Cathode Layer 5 (Fourth Step)

Anode body 2 including dielectric layer 3 which was covered with solid electrolyte layer 4, obtained in the above step (4), was immersed in a dispersion liquid in which graphite particles were dispersed in water. After that, anode body 2 was taken out of the dispersion liquid, and was dried, to form carbon layer 5a. The drying was conducted at a temperature ranging from 130° C. to 180° C. (both inclusive) for a period ranging from 10 minutes to 30 minutes (both inclusive). Then, a silver paste containing silver particles and a binder resin (epoxy resin) was applied onto the surface of carbon layer 5a. After that, the silver paste was heated at a temperature ranging from 150° C. to 200° C. (both inclusive) for a period ranging from 10 minutes to 60 minutes (both inclusive) to cure the binder resin, so that silver paste layer 5b was formed. Thus, cathode layer 5 was formed, which included carbon layer 5a and silver paste layer 5b. As described above, capacitor element 11 was prepared.

(6) Assembling of Electrolytic Capacitor

Cathode layer 5 of capacitor element 11, obtained in the above step (5), was bonded with one end (first end) 14a of cathode terminal 14 by conductive adhesive 17. The other end of anode body 2, which protruded from capacitor element 11, was joined with one end (first end) 13a of anode terminal 13 by laser welding. Then, resin outer packing 12 formed of an insulating resin was formed around capacitor element 11 by a transfer molding method. Then, other end (second end) 13b of anode terminal 13 and other end (second end) 14b of cathode terminal 14 were in a state of being drawn out from resin outer packing 12. Thus, electrolytic capacitor 1 was completed. In the same manner as described above, a total of 250 electrolytic capacitors 1 were prepared.

(7) Evaluation

The following evaluation was conducted for anode body 2 including dielectric layer 3 covered with solid electrolyte layer 4 or the electrolytic capacitors.

(a) ESR

From the electrolytic capacitors that have been prepared, 120 electrolytic capacitors were randomly selected. An ESR value (mΩ) for each of the electrolytic capacitors was measured at a frequency of 100 kHz by an LCR meter for 4-terminal measurement, and an average value was calculated with respect to the ESR value.

(b) Leakage Current

A voltage of 10 V was applied between anode body 2 and cathode layer 5 of each of the electrolytic capacitors, and leakage current after 40 seconds was measured. Then, quality determination was conducted by comparing a measurement result to a predetermined reference value, and a yield ratio was obtained.

(c) Withstand Voltage

A voltage was applied to each of the electrolytic capacitors at an increasing rate of 1.0 V/sec., and a breakdown voltage (BDV) was measured, at which an overcurrent of 1 A flowed. An average value was calculated with respect to the BDV for the 250 electrolytic capacitors.

Examples 2 and 3 and Comparative Examples 1 and 2

Solid electrolyte layer 4 was formed in the same manner as in Example 1 except that in the step B, the water-soluble polymers (p2) to (p5) shown in Table 1 were used in place of the acrylic acid-methacrylic acid copolymer (p1), and then electrolytic capacitors were prepared. The same evaluations as in Example 1 were conducted for the electrolytic capacitors.

The water-soluble polymers used in the examples and comparative examples are collectively shown in the following.

(p1) Acrylic acid-methacrylic acid copolymer: random copolymer, copolymerization ratio (molar ratio): acrylic acid:methacrylic acid=50:50, weight average molecular weight 100,000

(p2) Acrylic acid-maleic acid copolymer: random copolymer, copolymerization ratio (molar ratio): acrylic acid:maleic acid=50:50, weight average molecular weight 50,000

(p3) Vinylphenol-styrene copolymer: random copolymer, copolymerization ratio (molar ratio): vinylphenol:styrene=50:50, weight average molecular weight 80,000

(p4) Polyvinyl alcohol: saponification degree 95%, weight average molecular weight 80,000

(p5) Polyacrylic acid: weight average molecular weight 40,000

Evaluation results of Examples 1 to 3 and Comparative Examples 1 and 2 are shown in Table 1.

TABLE 1

| | Second conductive polymer layer Water-soluble polymer | Leakage current (Yield ratio) (%) | Withstand voltage (V) | ESR (mΩ) |
|---|---|---|---|---|
| Example 1 | (p1) Acrylic acid-methacrylic acid copolymer | 100 | 56 | 32 |
| Example 2 | (p2) Acrylic acid-maleic acid copolymer | 100 | 54 | 31 |
| Example 3 | (p3) Vinylphenol-styrene copolymer | 100 | 58 | 37 |
| Comparative Example 1 | (p4) Polyvinyl alcohol | 92 | 47 | 263 |
| Comparative Example 2 | (p5) Polyacrylic acid | 72 | 36 | 41 |

In Comparative Example 1, the withstand voltage was low and the ESR value was remarkably large, as shown in Table 1. This is considered to be caused because the film quality of solid electrolyte layer 4 was poor to cause cracks, so that conductivity of solid electrolyte layer 4 was deteriorated. In Comparative Example 2, the ESR value was suppressed low to some degree, while the withstand voltage was greatly deteriorated. This is considered to be caused because the film quality of solid electrolyte layer 4 was deteriorated. In the examples (Examples 1 to 3), on the other hand, high withstand voltage was obtained and the ESR value was also low, compared to Comparative Examples 1 and 2. This is considered to be caused because, in the examples, the film quality of solid electrolyte layer 4 (particularly, second conductive polymer layer 4b) was improved, and cracks were also suppressed, so that strength of solid electrolyte layer 4 was enhanced, compared to the comparative examples. For the reasons described above, leakage current in the examples is considered to have been also reduced, compared to Comparative Examples 1 and 2.

Examples 4 to 10

Solid electrolyte layer 4 was formed in the same manner as in Example 1 except that in the step B of Example 1, an acrylic acid-methacrylic acid copolymer (random copolymer) having a weight average molecular weight shown in Table 2 was used in place of the acrylic acid-methacrylic acid copolymer (p1), and then electrolytic capacitors were prepared. The same evaluations as in Example 1 were conducted for the electrolytic capacitors.

Example 11

Solid electrolyte layer 4 was formed in the same manner as in Example 1 except that in the step B of Example 1, PSS (weight average molecular weight: 200,000) was used as a dopant, and an acrylic acid-methacrylic acid copolymer (random copolymer, weight average molecular weight: 30,000) was used in place of the acrylic acid-methacrylic acid copolymer (p1), and then electrolytic capacitors were prepared. The same evaluations as in Example 1 were conducted for the electrolytic capacitors. Evaluation results of Examples 4 to 11 are shown in Table 2. In Table 2, the weight average molecular weight of the water-soluble polymer used, and the ratio of the weight average molecular weight of the water-soluble polymer to the weight average molecular weight of the dopant are shown in each of the examples as well as the evaluation results of Example 1.

Also in Examples 4 to 11, similarly to Example 1, high withstand voltage was obtained and the ESR value was reduced, compared to Comparative Examples 1 and 2, as shown in Table 2. When the ratio of the weight average molecular weight of the water-soluble polymer to the weight average molecular weight of the high-molecular-weight dopant ranged from 0.15 to 2 (both inclusive), the ESR was lower. When the ratio between the weight average molecular weights ranged from 0.4 to 2 (both inclusive), the ESR was further lower. From the viewpoint of obtaining a lower ESR value, the weight average molecular weight of the water-soluble polymer is preferred to be more than 15,000 and less than 300,000.

The electrolytic capacitor according to the exemplary embodiment of the present disclosure can be used for various uses in which high withstand voltage and low ESR are required.

What is claimed is:

1. An electrolytic capacitor comprising:
an anode body;
a dielectric layer formed on the anode body; and
a solid electrolyte layer covering at least a portion of the dielectric layer, wherein:
the solid electrolyte layer includes a π-conjugated conductive polymer, a high-molecular-weight dopant having an acid group, and a water-soluble polymer,
the water-soluble polymer is a copolymer including a hydrophilic monomer unit having a hydrophilic group, and
the hydrophilic group is at least one group selected from the group consisting of a carboxyl group, an acid anhydride group, a phenolic hydroxyl group, and a $C_{2-3}$ alkylene oxide group.

2. The electrolytic capacitor according to claim 1, wherein the water-soluble polymer is a polymer that is neither the π-conjugated conductive polymer nor the high-molecular-weight dopant.

3. The electrolytic capacitor according to claim 1, wherein the copolymer includes, as the hydrophilic monomer unit, a first monomer unit having at least one hydrophilic group selected from the group consisting of a carboxyl group, an acid anhydride group, and a phenolic hydroxyl group.

4. The electrolytic capacitor according to claim 3, wherein a first monomer corresponding to the first monomer unit is at least one monomer selected from the group consisting of acrylic acid, a 2-$C_{1-4}$ alkyl-2-propenoic acid, maleic acid, maleic anhydride, and fumaric acid.

TABLE 2

| | Weight average molecular weight of water-soluble polymer | Ratio between weight average molecular weights in Water-soluble polymer/PSS | Leakage current (Yield ratio) (%) | Withstand voltage (V) | ESR (mΩ) |
|---|---|---|---|---|---|
| Example 11 | 30000 | 0.15 | 100 | 54 | 35 |
| Example 4 | 15000 | 0.20 | 100 | 53 | 34 |
| Example 5 | 30000 | 0.40 | 100 | 55 | 33 |
| Example 6 | 50000 | 0.67 | 100 | 56 | 32 |
| Example 7 | 75000 | 1.00 | 100 | 58 | 32 |
| Example 1 | 100000 | 1.33 | 100 | 56 | 32 |
| Example 8 | 150000 | 2.00 | 100 | 58 | 33 |
| Example 9 | 300000 | 4.00 | 100 | 60 | 38 |
| Example 10 | 375000 | 5.00 | 100 | 60 | 40 |

5. The electrolytic capacitor according to claim 4, wherein the first monomer is at least one monomer selected from the group consisting of acrylic acid and a 2-$C_{1-2}$ alkyl-2-propenoic acid.

6. The electrolytic capacitor according to claim 1, wherein the copolymer is a random copolymer.

7. The electrolytic capacitor according to claim 1, wherein the copolymer includes, as the hydrophilic monomer unit, a second monomer unit having an ethylene oxide group as a hydrophilic group.

8. The electrolytic capacitor according to claim 1, wherein:
the copolymer further includes a third monomer unit, and
a third monomer corresponding to the third monomer unit is at least one monomer selected from the group consisting of a vinyl monomer having an ester group, and an aromatic vinyl monomer.

9. The electrolytic capacitor according to claim 1, wherein a ratio of a weight average molecular weight of the water-soluble polymer to a weight average molecular weight of the high-molecular-weight dopant ranges from 0.1 to 10, both inclusive.

10. The electrolytic capacitor according to claim 1, wherein the water-soluble polymer has a weight average molecular weight ranging from 20,000 to 200,000, both inclusive.

11. The electrolytic capacitor according to claim 1, wherein the water-soluble polymer is at least one selected from the group consisting of a copolymer of acrylic acid and methacrylic acid, a copolymer of acrylic acid and maleic acid, and a copolymer of vinylphenol and styrene.

12. The electrolytic capacitor according to claim 1, wherein:
the solid electrolyte layer includes a first conductive polymer layer and a second conductive polymer layer, and
the second conductive polymer layer includes the π-conjugated conductive polymer, the high-molecular-weight dopant, and the water-soluble polymer.

13. An electrolytic capacitor comprising:
an anode body;
a dielectric layer formed on the anode body; and
a solid electrolyte layer covering at least a portion of the dielectric layer, wherein:
the solid electrolyte layer includes a π-conjugated conductive polymer, a high-molecular-weight dopant having an acid group, and a water-soluble polymer, and
the water-soluble polymer is at least one selected from the group consisting of a copolymer of acrylic acid and methacrylic acid, a copolymer of acrylic acid and maleic acid, and a copolymer of vinylphenol and styrene.

14. The electrolytic capacitor according to claim 13, wherein a ratio of the weight average molecular weight of the water-soluble polymer to a weight average molecular weight of the high-molecular-weight dopant ranges from 0.1 to 10, both inclusive.

15. The electrolytic capacitor according to claim 13, wherein the water-soluble polymer has a weight average molecular weight ranging from 20,000 to 200,000, both inclusive.

16. The electrolytic capacitor according to claim 13, wherein:
the solid electrolyte layer includes a first conductive polymer layer and a second conductive polymer layer, and
the second conductive polymer layer includes the π-conjugated conductive polymer, the high-molecular-weight dopant, and the water-soluble polymer.

17. An electrolytic capacitor comprising:
an anode body;
a dielectric layer formed on the anode body; and
a solid electrolyte layer covering at least a portion of the dielectric layer, wherein:
the solid electrolyte layer includes a π-conjugated conductive polymer, a high-molecular-weight dopant having an acid group, and a water-soluble polymer,
the water-soluble polymer is a copolymer including a hydrophilic monomer unit having a hydrophilic group, and
a ratio of the weight average molecular weight of the water-soluble polymer to a weight average molecular weight of the high-molecular-weight dopant ranges from 0.1 to 10, both inclusive.

18. The electrolytic capacitor according to claim 17, wherein a ratio of the weight average molecular weight of the water-soluble polymer to a weight average molecular weight of the high-molecular-weight dopant ranges from 0.15 to 5, both inclusive.

19. The electrolytic capacitor according to claim 17, wherein a ratio of the weight average molecular weight of the water-soluble polymer to a weight average molecular weight of the high-molecular-weight dopant ranges from 0.4 to 2, both inclusive.

20. The electrolytic capacitor according to claim 17, wherein the water-soluble polymer has a weight average molecular weight ranging from 20,000 to 200,000, both inclusive.

21. The electrolytic capacitor according to claim 17, wherein the water-soluble polymer has a weight average molecular weight ranging from 30,000 to 150,000, both inclusive.

22. The electrolytic capacitor according to claim 17, wherein the water-soluble polymer is at least one selected from the group consisting of a copolymer of acrylic acid and methacrylic acid, a copolymer of acrylic acid and maleic acid, and a copolymer of vinylphenol and styrene.

23. The electrolytic capacitor according to claim 17, wherein:
the solid electrolyte layer includes a first conductive polymer layer and a second conductive polymer layer, and
the second conductive polymer layer includes the π-conjugated conductive polymer, the high-molecular-weight dopant, and the water-soluble polymer.

24. A conductive polymer dispersion for manufacturing an electrolytic capacitor, the conductive polymer dispersion comprising:
a π-conjugated conductive polymer;
a high-molecular-weight dopant having an acid group;
a water-soluble polymer that is neither the π-conjugated conductive polymer nor the high-molecular-weight dopant; and
a solvent, wherein:
the water-soluble polymer is a copolymer including a hydrophilic monomer unit having a hydrophilic group, and
the hydrophilic group is at least one group selected from the group consisting of a carboxyl group, an acid anhydride group, a phenolic hydroxyl group, and a $C_{2-3}$ alkylene oxide group.

25. The conductive polymer dispersion according to claim 24, wherein the water-soluble polymer is at least one selected from the group consisting of a copolymer of acrylic acid and methacrylic acid, a copolymer of acrylic acid and maleic acid, and a copolymer of vinylphenol and styrene.

26. The conductive polymer dispersion according to claim 24, wherein the water-soluble polymer has a weight average molecular weight ranging from 20,000 to 200,000, both inclusive.

27. A conductive polymer dispersion for manufacturing an electrolytic capacitor, the conductive polymer dispersion comprising:
   a π-conjugated conductive polymer;
   a high-molecular-weight dopant having an acid group;
   a water-soluble polymer; and
   a solvent, wherein:
   the water-soluble polymer is a copolymer including a hydrophilic monomer unit having a hydrophilic group, and
   a ratio of a weight average molecular weight of the water-soluble polymer to a weight average molecular weight of the high-molecular-weight dopant ranges from 0.1 to 10, both inclusive.

28. The conductive polymer dispersion according to claim 27, wherein the water-soluble polymer has a weight average molecular weight ranging from 20,000 to 200,000, both inclusive.

29. The conductive polymer dispersion according to claim 27, wherein the ratio of the weight average molecular weight of the water-soluble polymer to the weight average molecular weight of the high-molecular-weight dopant ranges from 0.4 to 2, both inclusive.

* * * * *